United States Patent
Bowles

[15] 3,677,674
[45] July 18, 1972

[54] HIGH PRODUCTION ISOSTATIC MOLDING DEVICE

[72] Inventor: Arnold Gordon Bowles, Warren, Pa.
[73] Assignee: National Forge Company, Irvine, Pa.
[22] Filed: March 9, 1971
[21] Appl. No.: 122,379

[52] U.S. Cl. ............................... 425/78, 425/128, 425/261, 425/437, 425/430, 425/148, 425/171
[51] Int. Cl. .................. B30b 5/02, B30b 11/02, B28b 3/00, B29c 6/02
[58] Field of Search .......................................... 18/5H; 25/45

[56] References Cited

UNITED STATES PATENTS

| | | | |
|---|---|---|---|
| 2,152,738 | 4/1939 | Jeffery | 18/5 H UX |
| 2,937,421 | 5/1960 | Taccone | 18/5 H X |
| 3,191,900 | 7/1965 | Wendt | 18/5 H X |
| 3,319,292 | 5/1967 | Witkin | 18/5 H |
| 3,451,101 | 6/1969 | Bowles | 18/5 H |
| 3,477,096 | 11/1969 | Bowles et al. | 18/5 H |
| 3,550,198 | 12/1970 | Roberts | 18/5 H |
| 3,577,405 | 1/1971 | Bowles | 18/5 H |
| 3,591,903 | 7/1971 | Bowles | 18/5 H |
| 3,593,373 | 7/1971 | Loomis | 18/5 H |

*Primary Examiner*—J. Howard Flint, Jr.
*Attorney*—Charles B. Smith

[57] ABSTRACT

A high production isostatic molding device comprising an upright, yoke type isostatic press and a turntable for rotating a plurality of elastomeric molds, hung beneath the table, sequentially through various processing stages including filling, pressing, and unloading. At one position a given mold is filled with compactible material from a hopper while being simultaneously vibrated. At another position the mold is positioned over a pressure vessel cylinder which is lifted up around the mold to engage a pressure end-block thereby forming a sealed pressure vessel. At still another stage the compacted material is lifted free of the mold and placed on a conveyor belt by a hydraulicly operated arm having a vacuum pad at its end and mounted on a wheeled carriage over the turntable.

9 Claims, 8 Drawing Figures

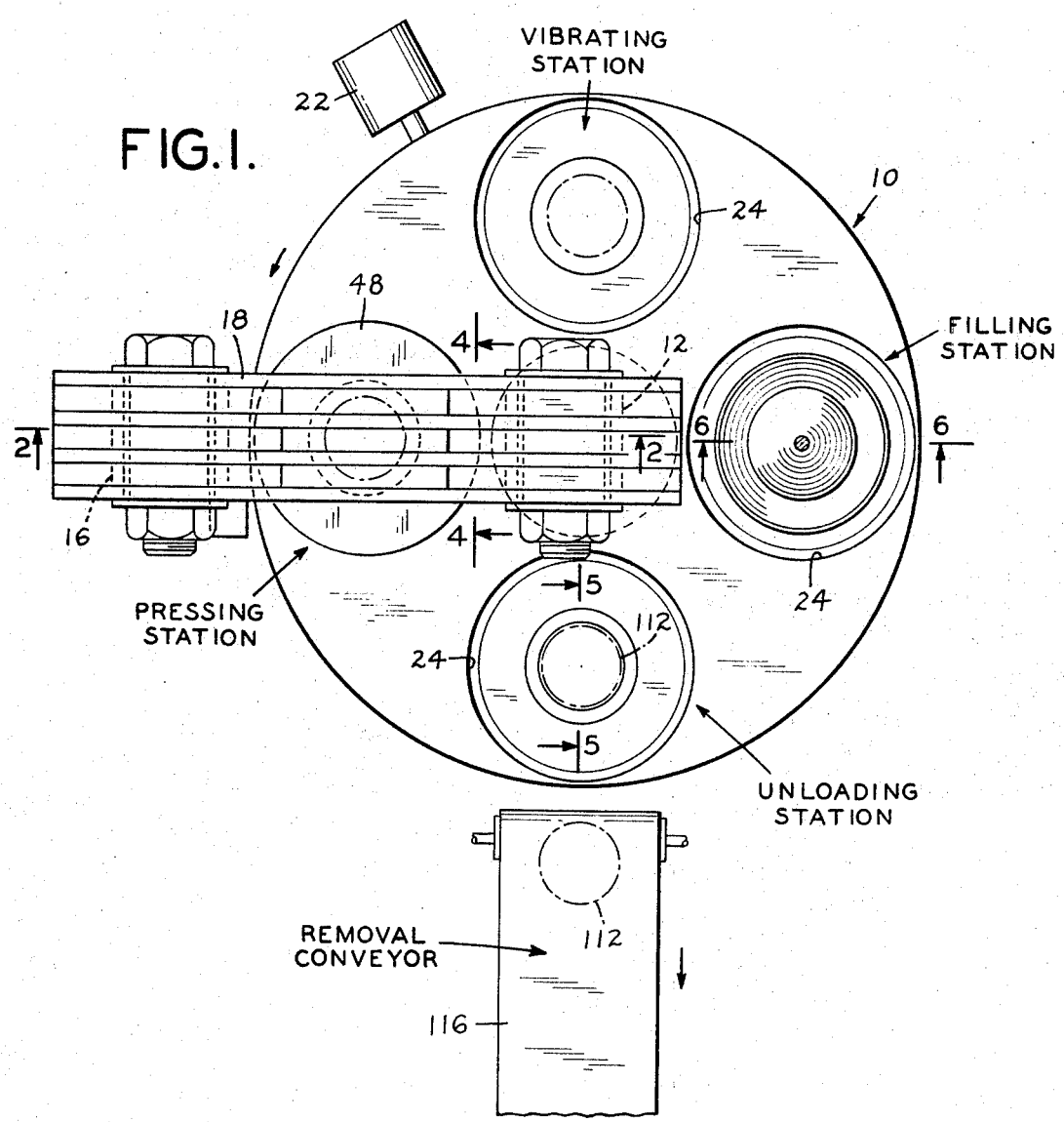
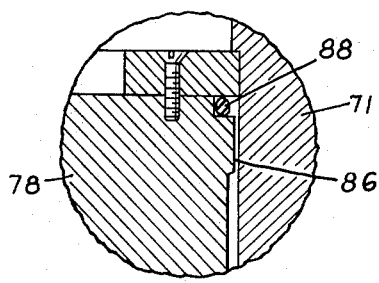
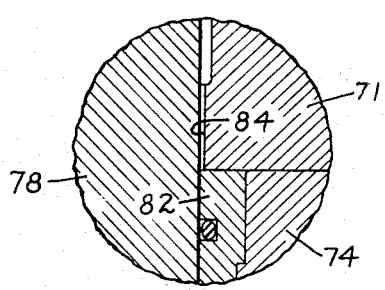

Patented July 18, 1972

Patented July 18, 1972

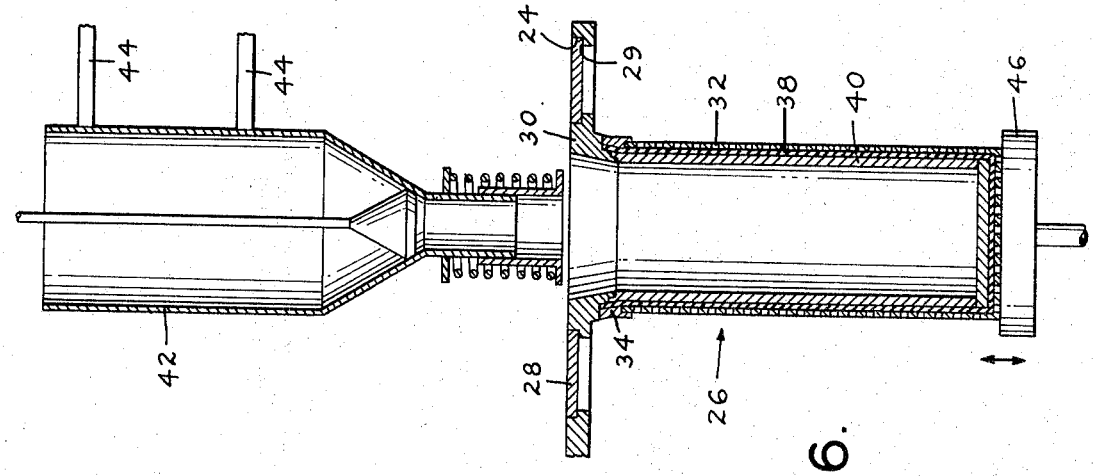
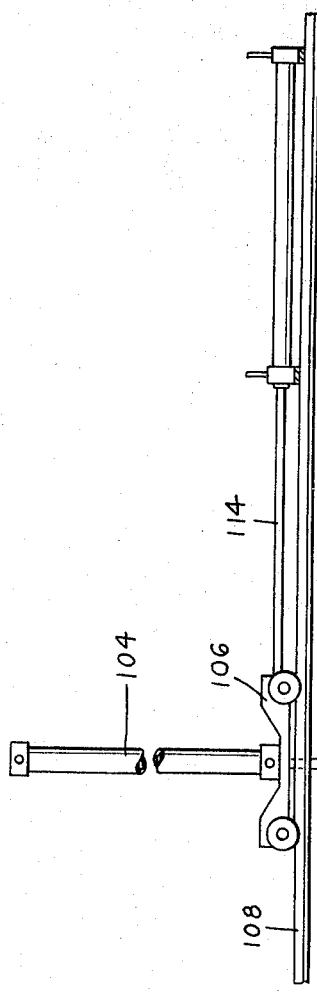
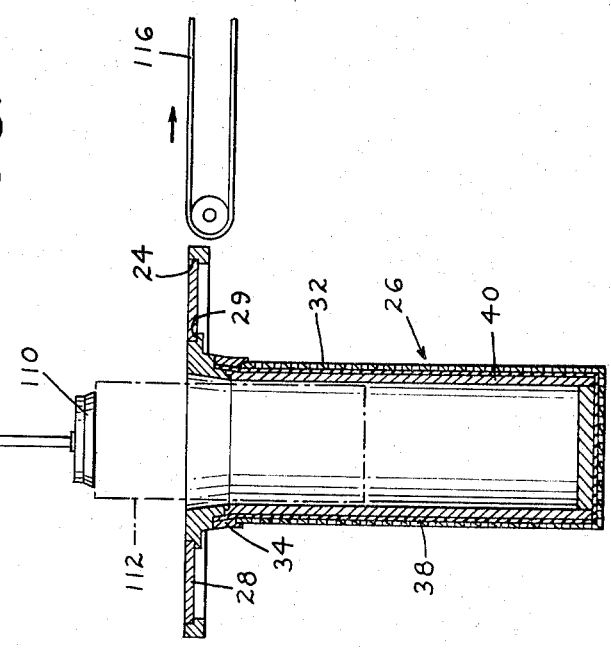
FIG.6.
FIG.5.

3,677,674

HIGH PRODUCTION ISOSTATIC MOLDING DEVICE

BACKGROUND OF THE INVENTION

The present invention relates to isostatic pressure vessels and more particularly to high production isostatic presses.

In most conventional methods of isostatic pressing a molding cycle consists of filling individual molds with compressible molding material, usually in powdered form, closing and sealing these molds, placing the filled molds within a pressure vessel, closing and locking the cover of the pressure vessel, pumping fluid into the pressure vessel to the desired hydrostatic pressure, venting the pressure vessel to relieve the pressure, unlocking and opening the pressure vessel, removing the mold, pumping out some of the fluid and finally emptying the molded article or compact out of the mold.

In such conventional systems the molding cycle is relatively slow. The isostatic press stands idle while the mold is being filled with, or emptied of, compact material. It is also time consuming to drain the press of fluid after the compressing cycle.

Some high production systems try to improve on the conventional method by the use of a shuttle apparatus to insert and extract the mold from the press. During a single molding cycle in such shuttle systems the following sequence of operations takes place:

1. the shuttle moves a first mold into the press, and then moves clear of the press,
2. the press is sealed and the material compacted,
3. the press is unsealed,
4. the shuttle removes the first mold and moves clear of the press,
5. a new mold is moved into position,
6. the new mold is placed into the press by either a new shuttle or the first shuttle mechanism to begin a second molding cycle.

Thus at least five steps are necessary for one complete molding cycle.

Some pressure vessels used in prior high production presses use either locking-pin or interrupted thread type closures. Such pressure vessel closures have numerous inherit stress concentration factors and are therefore expensive to design and construct.

SUMMARY OF THE INVENTION

The above and other disadvantages are overcome by a preferred embodiment of the present invention which comprises an upright, open-ended, yoke type isostatic pressure vessel and a turntable supporting a plurality of molds which are rotated through various processing stages including a pressing stage. Each mold has a blind cylindrical tooling contained within a bag-shaped rubber diaphragm. The bag and tooling are seated within a perforated metal cannister suspended through a recess to hang beneath the turntable. The tooling is made of an elastomeric compound such as urethane.

The turntable carrying the molds is indexed to carry each mold sequentially through a predetermined number of stations. A given mold is first aligned under a hopper which fills the mold with a compactible material. During the filling operation the mold being filled is lifted slightly from the turntable by a vibrating or jogging mechanism which settles the compact material within the mold.

When the filling operation is complete the mold is lowered back to the turntable which is then indexed to a second predetermined position or station where the level of the material within the mold and the weight of the mold are checked manually or automatically. The mold is also given extra jogging at this station.

The turntable is next indexed to a third or pressing station placing the mold beneath an upper pressure block mounted in the top portion of a yoke type frame. The upper pressure block has a mold end-closure plug protruding beneath it. Under the mold is a hollow, pressure vessel cylinder and a lower arbor coaxially within the cylinder. During the pressing stage the cylinder is lifted up through the turntable recess by a piston to surround the mold. As the cylinder is raised, fluid is pumped into the cylinder to fill the space between the mold and the cylinder. To ensure complete filling, an excess of fluid is pumped which spills over the top end of the cylinder into an annular space between the outer surface of the cylinder and a drain jacket surrounding the cylinder. The drain jacket is raised with the cylinder.

The mold remains seated in the recess in the turntable until the cylinder is a few inches from completing its upward movement. Near the end of the upward movement the mold is lifted from the turntable by the cylinder and forced against the under side of the upper pressure block. At this point the mold end-plug protruding beneath the pressure block closes the end of the tooling.

High pressure seals on the mold assembly and the top of the arbor engage the cylinder the last few inches of travel. The cylinder is thus closed at both ends to form a pressure vessel. The upper end of the cylinder is sealed by the upper pressure block and mold assembly and its lower end is sealed by the top of the lower arbor.

Fluid injected into the vessel under high pressure through ports in the lower arbor compacts the material within the mold. The rubber diaphragm prevents the fluid from contacting the tooling or the material.

After the material is isostatically compacted the vessel is depressurized and the cylinder lowered, spilling fluid down the annular space between the cylinder and the drain jacket. The turntable is then indexed to a fourth station or unloading position where the compacted material is extracted from the mold.

In the fourth station a vertically retractable arm mounted on a wheeled carriage suspended on a framework over the turntable extends down to fasten on to the end of the compacted material by means of a vacuum pad. The arm is retracted upward lifting the compact clear of the mold. The arm and carriage are moved horizontally to place the compacted material over a conveyor belt where it is released and carried away for further processing. The empty mold is indexed by the turntable to the filling station to begin another molding cycle.

It should be apparent that the operations at the four positions of the turntable are continuous; there are four molding cycles operating in sequence at the same time.

A high production press according to the invention has the advantage over some conventional isostatic pressing systems of fast cycling while using only one pressure vessel because the operations of filling, jogging, checking and stripping the molds are done outside of the pressure vessel while the vessel is simultaneously pressing a given mold.

Furthermore, the removal of the molds from the press is fast relative to prior high production presses involving the use of a shuttle system as described above. In the operation of the present invention only three steps are required to load and unload the molds into the press as opposed to the five steps required of the shuttle system:

1. the pressure vessel cylinder is lifted by a hydraulic piston to surround the mold and seal (ie. to close the pressure vessel) against the upper pressure block while simultaneously being filled with fluid,
2. after pressurization the cylinder is dropped away from the mold (ie. opening the pressure vessel) while the fluid is simultaneously drained from the vessel,
3. a second mold is rotated by the turntable into the pressing position beneath the upper pressure block and over the pressure vessel cylinder while the first mold is simultaneously rotated away for extraction from the mold.

The use of a turntable and the use of a pressure vessel formed by a vertically extendable cylinder allows the elimination of the separate steps of inserting a carrying mechanism for the mold within the pressure vessel, extracting the mechanism, sealing the vessel and then repeating the operation to remove the compact. A saving in time is thus effected.

Since a high production press according to one embodiment of the invention is designed to produce billet shaped compacts at a rate of three per minute this saving in time is economically significant.

A still further advantage of the present invention is that the pressure vessel is designed as a simple cylinder, free of stress concentration effects which occur in a vessel having a locking-pin closure or an interrupted thread closure. The vessel is also relatively inexpensive to replace after damage due to fatigue. The inner portion of the pressure cylinder is in the form of a shell which can be replaced without the necessity of replacing the outer shell.

While the above preferred embodiment has been designed for pressing compacts of aluminum powder in the shape of cylindrical billets weighing approximately 300 pounds, other embodiments are capable of pressing compacts of different shapes and weights. For example, the mold could be comprised of an elastomeric tooling in the shape of two spherical halves to produce a round compact. The elastomeric tooling and rubber diaphragm could be in the shape of a rectangle to produce a square or cubic compact. Other shapes might include web or waffle-like structures, bricks, and compacts reinforced with wire or formed on mandrels.

In some embodiments more than one compact may be pressed at the same time, the only limitation being the internal diameter of the pressure vessel cylinder. For example, small individual toolings in the shape of spark plug insulators may be isostatically pressed several at a time.

In these other embodiments the mechanisms for lifting the compacts clear of the molds and for filling the molds initially must be modified from the above described preferred embodiment to fill and strip a predetermined number of molds at one time. It should be noted, however, that the basic apparatus, including the turntable and the press are substantially the same. Because of the isostatic pressing technique, the interior dimensions of the press itself need not be changed to accommodate different shaped molds.

Thus it is an object of the present invention to provide a high production isostatic pressing system having a fast molding cycle while using only one pressure vessel.

It is a further object of the present invention to provide such a pressing system in which the operation of removing one mold from the press and replacing it with another mold is done in a minimum number of steps.

It is still another object of the present invention to provide a high production isostatic pressing system in which the pressure vessel is relatively free of stress concentration effects and may be inexpensively replaced.

The foregoing and other objectives, features, and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a plan view of a preferred embodiment of the invention;

FIGS. 2A and 2B are enlarged detail views in section of the areas encircled in FIG. 2;

FIG. 5 is a vertical view partly in section taken generally along the line 5—5 of FIG. 1 and additionally showing the mechanism for extracting the compacts from the molds as it appears when extended over the turntable;

FIG. 6 is a vertical view in section and with portions broken away of the filling station of the embodiment of FIG. 1 taken generally along the line 6—6 of FIG. 1.

DESCRIPTION OF CERTAIN PREFERRED EMBODIMENTS

Figure 2:
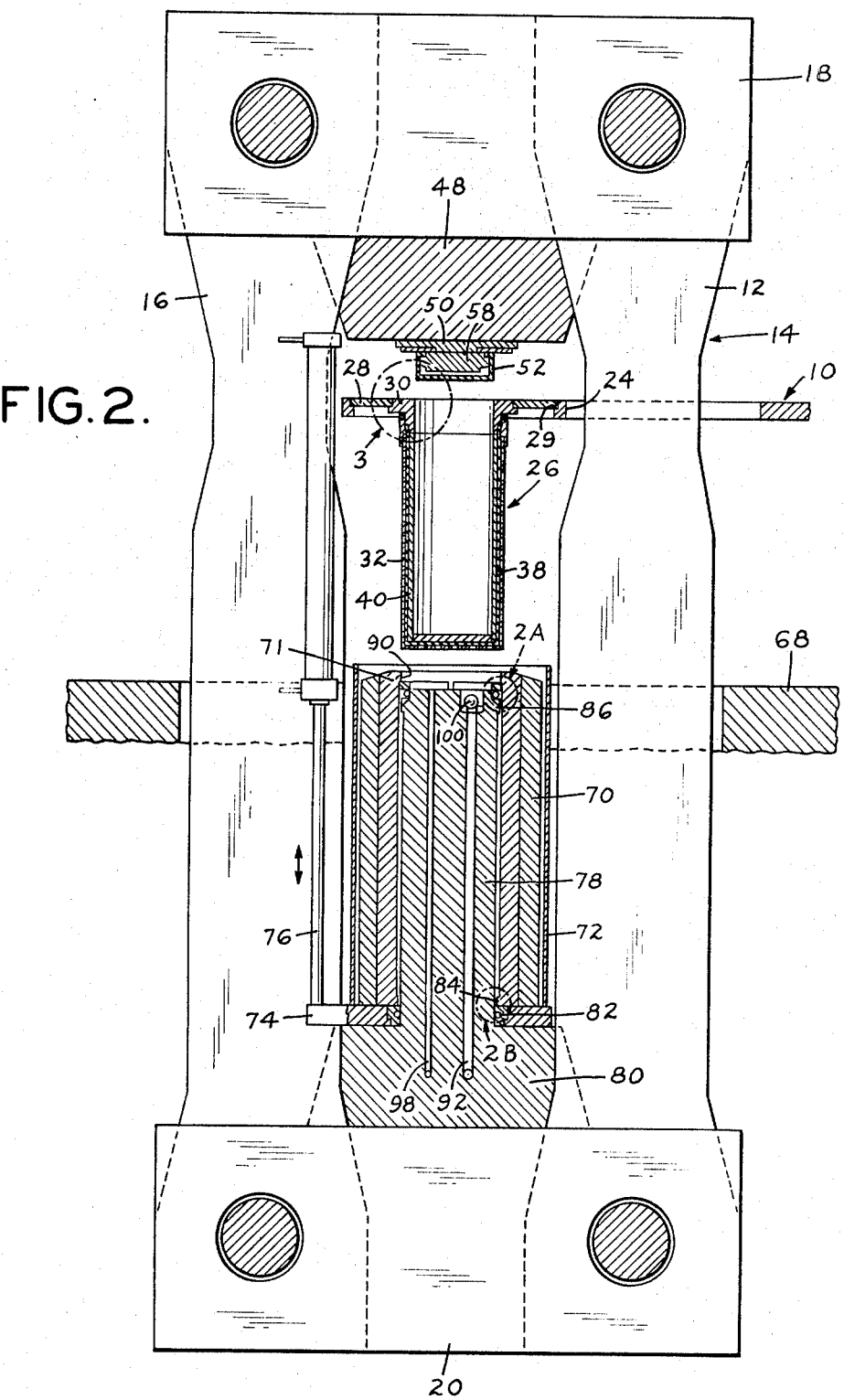
FIG. 2 is a vertical sectional view of the pressing station of the embodiment of FIG. 1 taken generally along the line 2—2 of FIG. 1.

Referring now more particularly to FIGS. 1 and 2 a turntable 10 is mounted for rotation about a vertical tie-member 12 of an upright, yoke type isostatic press designated generally as 14. The other vertical tie-member 16 of the press is parallel to and opposite from the tie-member 12 so that one-half of the turntable rotates between them. The tops of the tie-members 12 and 16 are joined by an upper, horizontal tie-member 18. The bottoms of the tie-members 12 and 16 are joined by a lower, horizontal tie-member 20 bolted at each end to one of the vertical tie-members. The members 12, 16, 18 and 20 are made of interlocking flat steel plates.

The turntable 10 is rotated counter-clockwise as viewed in FIG. 1 by a hydraulic or an electric motor operated mechanism 22. The table is provided with four holes or recesses 24 evenly spaced 90° apart from each other. The table rotating mechanism indexes the table such that each one of the four holes is aligned with a separate one of four operational stations spaced at ninety degree intervals about the table.

A complete molding cycle and the apparatus for carrying it out will now be described with reference to a particular mold. It should be recognized, however, that three other mold cycles are simultaneously being carried out in sequence.

Figure 3:
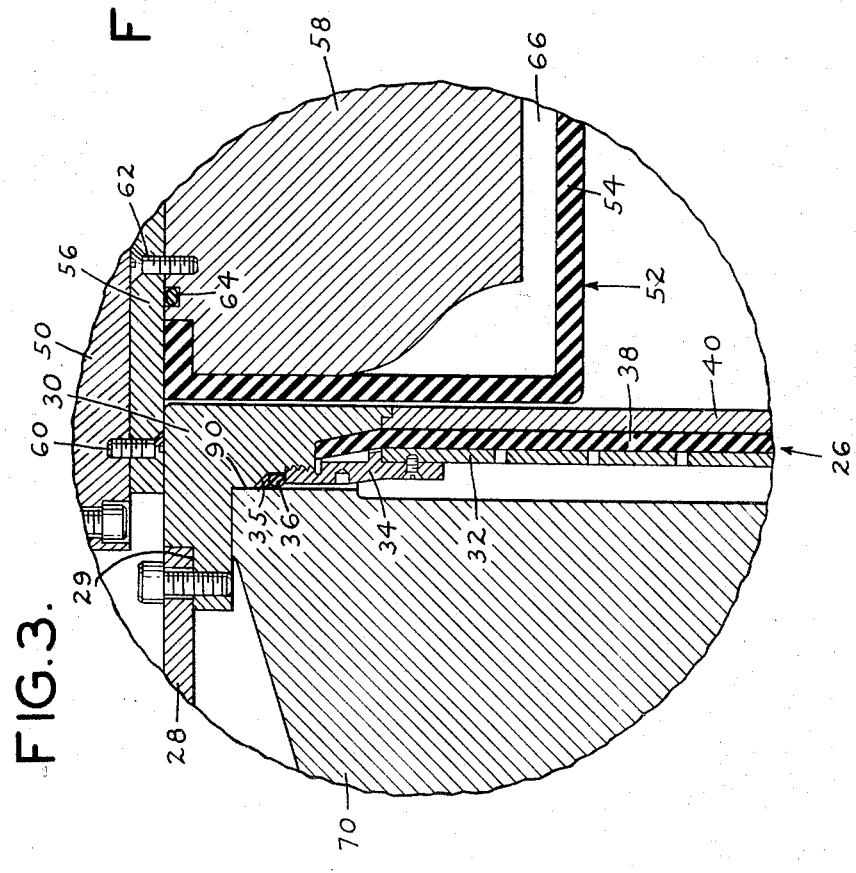
FIG. 3 is an enlarged vertical view in section of the detail encircled in FIG. 2 but showing the pressure vessel cylinder fully extended upward in the closed position.

Referring now more particularly to FIGS. 2 and 3 there is shown a mold assembly 26 suspended through a recess 24 in the turntable to hang beneath the turntable. The mold assembly 26 is comprised of a seating ring 28 which rests upon shoulders 29 within the recess 24. The mold assembly 26 is suspended beneath the turntable 10 by the seating ring 28. The seating ring 28 has a hole in its middle through which a collar 30 is inserted. The collar is bolted to the under side of the seating ring 28 about the edge of the hole.

A perforated metal cannister 32 is affixed to the collar 30 by an annular metal bracket 34. The upper edge of the bracket 34 in conjunction with a retaining ring 35 fitted about the collar 30 forms an annular groove within which an O-ring seal 36 is fitted about the collar. A rubber diaphragm 38 in the shape of a bag is fitted within the cannister 32. The upper lip of the bag 38 is squeezed between the bracket 34 and the collar 30 to hold it in place. Within the rubber bag 38 and abutting the collar 30 is an elastomeric tooling 40 in the form of a blind cylinder.

Referring now more particularly to FIGS. 1 and 6, at the first position or filling station of the molding cycle the mold assembly 26 is indexed by the turntable 10 beneath a hopper 42 which is suspended over the turntable on a stationery framework 44. The hopper is activated either manually or automatically to fill the cylindrical tooling 40 with the material to be compacted. The hopper feed mechanism is programmed to measure a predetermined amount of compact material into the tooling. Simultaneously with the filling of the tooling 40 a retractable vibrating mechanism 46 lifts the mold assembly 26 slightly off the table and vibrates or jogs the mold assembly to settle the powder within the tooling and to ensure an even distribution of the compact material.

The turntable 10 is next indexed counter-clockwise one quarter turn to an extra vibrating and checking station. At this station a mechanism (not shown) beneath the turntable substantially identical to the retractable vibrating mechanism 46 again lifts the mold assembly from the turntable and vibrates the material inside to thoroughly distribute it. The filled mold assembly 26 is also checked for weight and height either automatically or manually against predetermined standards. When a nonconforming tooling is detected, causing the machine to stop for manual adjustment of the fill.

From the checking and extra vibrating station the turntable 10 is again indexed counter-clockwise one quarter turn as viewed in FIG. 1 to the pressing station. The mold assembly 26 is now aligned between the vertical tie-members 12 and 16 of the isostatic press 14.

Fitted between the vertical tie-members 12 and 16 and affixed to the upper, horizontal tie-member 18 is an upper pressure block 48. At the bottom surface of the pressure block 48 is a projecting annular shoulder 50. Attached to the shoulder 50 is a mold end-plug 52. During the pressing stage the mold end-plug 52 is fitted into the open end of the mold assembly 26 to close it as will be explained more fully below.

Referring now more particularly to FIGS. 2 and 3, the mold end-plug 52 has a outer elastomeric covering 54 made of a material such as urethane. The covering 54 is in the shape of a cylindrical plug. The upper edges of the covering 54 are squeezed between a plate 56 and a solid inner core 58 encased by the covering. The plate 56 is attached to the shoulder 50 by a series of countersunk screws 60. The inner core member 58 is attached to the plate 56 by a series of countersunk screws 62. An O-ring seal 64 is fitted into an annular groove in the upper surface of the inner core 58 to make a fluid-tight seal against the plate 56.

The bottom portion of the inner core is reduced in diameter to leave an annular space between the bottom outer edge of the core 58 and the covering 54. The bottom surface of the core 58 is also spaced apart from the bottom surface of the covering 54. The annular space and the space between the bottom surfaces communicate with each other to constitute a cavity 66 between the core 58 and the covering 54 which is filled with hydraulic fluid. During pressurization the upper edge of the tooling 40 is pressed inwardly to form a large radius bend around the mold end-plug 52 rather than a short radius bend. A short radius bend would occur if the mold end-plug were made of a non-flexible material such as steel. Having a large radius bend prevents damage to the tooling from flaring and produces a cylindrical blank of compacted material having a substantially uniform diameter throughout its length.

Sunk into a recess in the floor 68 directly beneath the suspended mold assembly 26 is a pressure vessel cylinder 70. The cylinder has an inner lining 71 which is replaceable. Surrounding the pressure vessel cylinder 70 is a drain jacket 72 which is spaced apart from the cylinder 70 to define an annular gap between the two. The cylinder 70 and the drain jacket 72 are supported on a platform 74 which may be raised and lowered vertically by a hydraulic piston 76 mounted on the vertical tie-member 16. Projecting upward through the platform and coaxially within the cylinder 70 and the drain jacket 72 is a lower arbor 78. The lower arbor is a cylindrical projection of a lower pressure block 80 mounted on the horizontal tie-member 20.

The platform 74 has a fluid seal 82 fitted about its interior edge which presses against the outer surface of the lower arbor 78. The bottom interior edge of the cylinder liner 71 has projection 84 which, as shown more clearly in FIG. 2B, is slightly spaced apart from the surface of the arbor 78 when the cylinder is in the fully lowered position. As shown more clearly in FIG. 2A the upper edge of the arbor has a projection 86 which is slightly spaced apart from the interior surface of the cylinder liner 71 when the cylinder is in the fully lowered position.

Slightly above the projection 86 is an annular seal assembly 88 recessed into the top of the arbor 78. When the pressure vessel cylinder 70 is raised by the piston 76 into the fully up position for pressing, the projection 84 on the cylinder liner 71 is aligned with the projection 86 and the seal 88 on the arbor 78 to close off the bottom of the pressure vessel cylinder 70.

The upper interior edge of the cylinder liner 71 has a protruding portion 90 which presses against the seal 36 in the collar ring 30 when the pressure vessel cylinder 70 is raised to its fully up position, as shown more clearly in FIG. 3. The engagement of the seal 36 with the protrusion 90 constitutes the upper closure of the pressure vessel cylinder 70 during the pressing stage.

The top of the rising pressure vessel cylinder 70 engages the outer lip of the collar 30 to lift the mold assembly 26 free of the table and press it against the upper pressure block 48. In doing so the mold end-plug 52, which is aligned with the open end of the tooling 40, becomes inserted in the upper end of the tooling and closes it. The upward forces exerted by the fluid during pressing are directly transmitted to the upper pressure block 48 and the upper horizontal tie-member 18.

Figure 4:
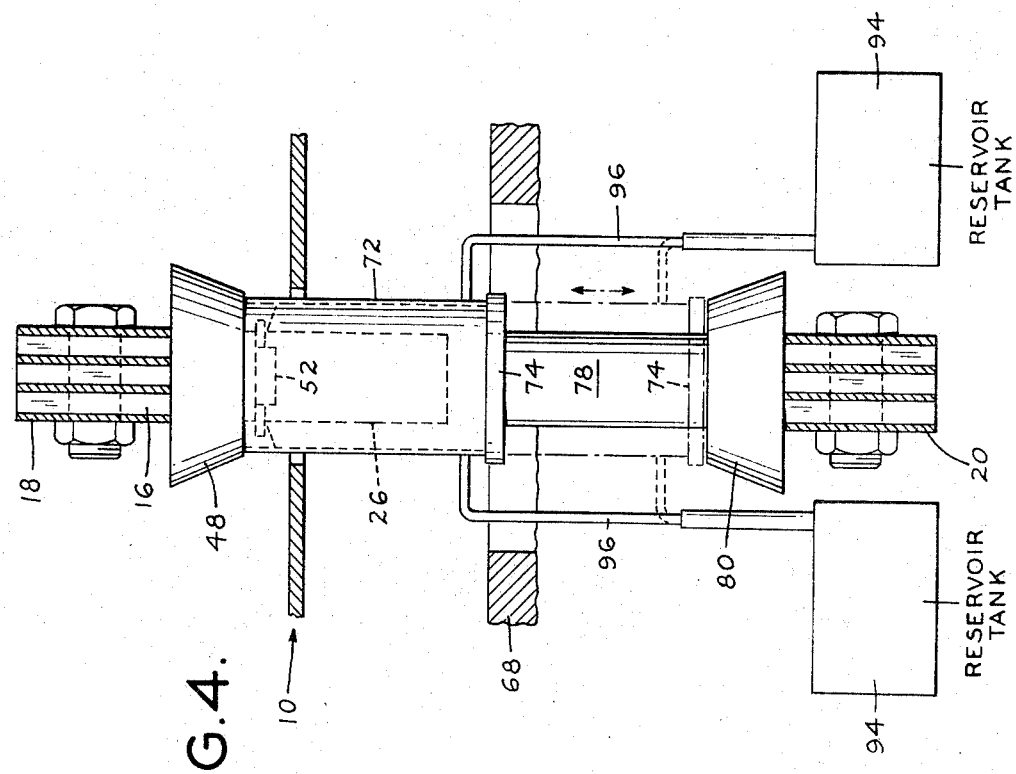
FIG. 4 is a vertical view taken generally along the line 4—4 of FIG. 1 but showing the pressure vessel cylinder and drain jacket fully extended upward in the closed position.

As the cylinder 70 is raised, fluid is pumped into the cylinder through a low pressure fill line 92 in the lower arbor 78. To ensure complete filling, an excess of fluid is pumped into the cylinder which spills over the top end of the cylinder into the annular space between the outer surface of the cylinder and the drain jacket 72. As is shown more clearly in FIG. 4 this annular space is connected with reservoir tanks 94 by a telescoping pipe assembly 96 connected between the bottom of the drain jacket 72 and the reservoir tanks 94.

When the pressure vessel cylinder 70 is in the fully up position, and thus sealed at both ends, the fluid pressure within the vessel is increased to approximately 40,000 pounds per square inch by fluid pumped through a high pressure fill line 98 in the lower arbor 78. A ball type check-valve 100 at the top of the low pressure fill line 92 prevents the fluid from being forced out the low pressure fill line. The high pressure fill line 98 has an external valve not shown. The high and low pressure fill lines 98 and 92 exit horizontally from the lower arbor.

After the pressing cycle is completed and the material is isostatically compacted, the fluid pressure within the vessel is relieved by opening the external valve in the high pressure fill line 98. The cylinder 70 is then lowered away from the mold assembly 26 which reseats on the turntable 10. The fluid within the cylinder spills over the sides of the cylinder 70 into the gap formed between it and the drain jacket 72. The fluid drains through the pipes 96 to the tanks 94 to be recycled. When the cylinder 70 is fully lowered the turntable is indexed ninety degrees counter-clockwise to position a new mold assembly for pressing and to rotate the now compacted material and its mold assembly to the unloading stage.

Referring now more particularly to FIG. 5 the unloading assembly is shown as comprising a vertically retractable arm 102 operated by a hydraulic piston 104. The piston and arm are mounted on a wheeled carriage 106 supported over the turntable by a horizontal frame 108. At the downward end of the arm 102 is a vacuum pad 110.

The compact material is unloaded from the mold assembly 26 by extending the arm 102 until the pad 110 contacts the top of the compact 112. The pad 110 is then vacuum fastened to the top of the compact and the arm is withdrawn, pulling the compact free of the mold assembly. A hydraulic piston 114 attached to the carriage 106 retracts to pull the carriage, the arm 102 and the attached compact 112 over a conveyor belt 116. The vacuum fastening is released to drop the compact 112 onto the conveyor belt 116 which carries the compact away for further processing. The turntable with the now empty mold assembly 26 is again indexed counter-clockwise 90° to begin another molding cycle.

In the above description various pistons have been described as being "hydraulic". In other embodiments the pistons could be pneumatic.

While the preferred embodiment of the invention has been described in reference to molding cylindrical billets, other embodiments use differently shaped molds. It is a feature of the isostatic pressing technique that the pressure vessel itself need not be altered internally, provided it has sufficiently large internal dimensions, to accommodate different shaped molds. The force exerted by the pressurized fluid is exerted isostatically upon the material being compacted, that is, the pressure is normal to every portion of the surface of the mold without regard to the shape of the mold.

It should be apparent that in some embodiments the second stage of weighing and checking the molds can be omitted. In such embodiments the three processing positions are equally spaced about the turntable and it rotates one hundred and twenty degrees between each station.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An isostatic molding press of the type wherein high pressure fluid compacts loose material contained within a mold inside a sealed pressure vessel wherein the improvement comprises rotatable support means for sequentially advancing a plurality of molds through at least a first, a second, and a third predetermined radial positions about a common axis, means for filling each mold in turn at the first radial position with the loose material, an upright isostatic pressure vessel located at the second radial position, the pressure vessel including a frame, a hollow pressure cylinder slidably mounted in the frame so as to be movable vertically between a lower position wherein the uppermost part of the cylinder is beneath the rotatable support means and an upper position wherein the cylinder is partially above the rotatable support means, means for lifting the cylinder to surround a select mold at the second radial position, means for sealing both ends of the cylinder after the select mold is surrounded by the cylinder, means for isostatically compacting the material within the sealed cylinder by injecting pressurized fluid into the cylinder, and means located at the third radial position for removing the compacted material from the select mold and from the rotatable support means.

2. An isostatic molding press as recited in claim 1 further comprising means located at the second radial position for vibrating each mold as it is being filled by the filling means.

3. An isostatic molding press as recited in claim 1 wherein the rotatable support means comprises a turntable having a plurality of holes in its surface at regular circumferential intervals, and means for advancing the turntable in discrete, equal fractions of a complete revolution.

4. An isostatic molding press as recited in claim 3 wherein each mold comprises a perforated metal cannister suspended through a select hole in the turnable to hang beneath it, a bag-shaped diaphragm, the diaphragm being disposed within the metal cannister and a cylindrical tooling of elastomeric material, the tooling being blind at its bottom end and disposed within the diaphragm with its blind end downward.

5. An isostatic molding press as recited in claim 1 comprising a plurality of molds, each mold including an elastomeric tooling which is open at one end, a support platform slidably mounted in the frame so as to be movable vertically, a drain jacket having an interior diameter greater than the outside diameter of the cylinder and mounted upon the platform co-axially with the cylinder to define a drain gap between the drain jacket and the cylinder, the drain jacket, cylinder and platform being vertically movable together by the lifting means, an upper pressure block mounted in the top of the frame, a lower pressure block mounted in the bottom of the frame, the lower pressure block having an upwardly projecting cylindrical portion co-axial with the cylinder and adapted so that the cylinder may slide up and down the cylindrical portion of the lower pressure block, and means within the pressure vessel for closing the open end of the tooling of the select mold at the second radial position when it is surrounded by the cylinder.

6. An isostatic molding press as recited in claim 1 wherein the means for removing the compacted material from the select mold comprises a frame which extends over the rotatable support means, a wheeled carriage movably mounted on the frame, a downwardly extending arm mounted on the wheeled carriage, a vacuum pad mounted at the downward end of the arm, and means for moving the wheeled carriage and arm horizontally upon the frame.

7. A high production isostatic molding device for compacting loose material comprising a plurality of molds, a turntable indexed to advance in fractions of a complete revolution to at least a filling position, a pressing position and an unloading position, the filling, pressing and unloading positions being radially spaced about a common axis, the turntable having a plurality of holes in its surface which are evenly spaced circumferentially about the turntable with each mold being suspended through a separate hole in the turntable, hopper means located at the filling position for filling a select mold with the loose material, means for vibrating the select mold to settle the material, a stationary isostatic press arranged so as to straddle a portion of the turntable at the pressing position, the press including an upright, yoke type frame, an upper pressure block mounted in the top of the frame, a lower pressure block aligned beneath the upper pressure block and mounted in the bottom of the frame, the lower pressure block having an upward cylindrical projection, a hollow pressure cylinder slidably mounted on the projection, a support slidably mounted in the frame, a hollow drain jacket having an inside diameter which is greater than the outside diameter of the cylinder, the cylinder and drain jacket being mounted co-axially together on the support so as to define an annular drain gap between them, means for lifting the support, together with the cylinder and drain jacket upwardly to surround the select mold with the cylinder and to lift the mold into engagement with the upper pressure block and for lowering the support, the cylinder, the drain jacket, and the select mold to their original positions, means for filling cylinder with fluid as it is being raised by the lifting means, first means for providing a seal between the select mold and the upper end of the cylinder, second means for providing a seal between the lower end of the cylinder and the projection so as to seal the lower end of the cylinder, the first and second sealing means together with the cylinder defining a closed, pressure vessel cavity, means for injecting fluid under high pressure into the closed cavity to compact the material within the select mold, a fluid reservoir, means for providing fluid communication between the drain jacket and the reservoir, and means located at the unloading position for extracting the compacted material from the select mold.

8. A high production isostatic molding device as recited in claim 7 comprising a turntable indexed to advance in substantially equal fractions of a complete revolution to a filling position, a checking position, a pressing position and an unloading position, means located at the checking position for comparing the quantity of material within the select mold with a predetermined standard and for providing an indication if the quantity substantially deviates from the standard.

9. A high production isostatic molding device for compacting loose material comprising a plurality of molds, each mold including a perforated metal cannister, a bag-shaped diaphragm disposed within the cannister, and a hollow tooling made of elastomeric material disposed within the diaphragm, a turntable indexed to advance in fractions of a complete turn to at least a first, a second and a third radial position about a common axis, the turntable having a plurality of holes in its surface which are evenly spaced circumferentially about the turntable with each mold being suspended through a separate hole in the turntable, hopper means located at the first radial position for filling the tooling of a select mold with the loose material, means for vibrating the select mold to settle the material, an isostatic press arranged so as to straddle a potion of the turntable at the second radial position, the press including an upright, yoke type frame, an upper pressure block mounted in the top of the frame, a lower pressure block aligned beneath the upper pressure block and mounted in the bottom of the frame, the lower pressure block having an upward cylindrical projection, a hollow pressure cylinder slidably mounted on the projection, a support slidably mounted on the projection, a hollow drain jacket having an inside diameter which is greater than the outside diameter of the cylinder, the cylinder and drain jacket being mounted co-axially together on the support so as to define an annular drain gap between them, means for lifting the support, together with the cylinder and drain jacket upwardly to surround the select mold with the cylinder and to lift the mold into engagement with the upper pressure block and for lowering the support, the cylinder, the drain jacket, and the mold to their original positions, means for filling the cylinder with fluid as it is being raised by the lifting means, first means for providing a seal between the select mold and the upper end of the cylinder, second means for providing a seal between the lower end of the cylinder and the projection, such that the first and second sealing means together with the cylinder define a closed, pressure vessel cavity, means for injecting fluid under high pressure into the closed cavity on the side of the diaphragm opposite the loose material to compact the material within the select mold, a fluid reservoir, means providing for fluid communication between the drain jacket and the reservoir, and means located at the third radial position for extracting the compacted material from the select mold.

* * * * *